United States Patent
Pan et al.

(10) Patent No.: US 9,294,655 B2
(45) Date of Patent: Mar. 22, 2016

(54) APPARATUS FOR AND METHOD OF PROCESSING DOCUMENT IMAGE

(71) Applicant: FUJITSU LIMITED, Kawasaki-shi, Kanagawa (JP)

(72) Inventors: Pan Pan, Beijing (CN); Yuan He, Beijing (CN); Jun Sun, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/561,786

(22) Filed: Dec. 5, 2014

(65) Prior Publication Data
US 2015/0163376 A1  Jun. 11, 2015

(30) Foreign Application Priority Data
Dec. 6, 2013 (CN) .......................... 2013 1 0656652

(51) Int. Cl.
*H04N 1/407* (2006.01)

(52) U.S. Cl.
CPC ...... *H04N 1/4072* (2013.01); *H04N 2201/0458* (2013.01)

(58) Field of Classification Search
None
See application file for complete search history.

(56) References Cited

U.S. PATENT DOCUMENTS

| | | | | |
|---|---|---|---|---|
| 6,643,398 B2* | 11/2003 | Moriwaki | | 382/167 |
| 7,715,628 B2* | 5/2010 | Jun et al. | | 382/176 |
| 8,340,472 B2* | 12/2012 | Yamada et al. | | 382/300 |
| 8,565,556 B2* | 10/2013 | Toda | | 382/300 |
| 8,693,783 B2* | 4/2014 | Huang et al. | | 382/199 |
| 8,792,139 B2* | 7/2014 | Makino | | 358/3.26 |
| 8,804,209 B2* | 8/2014 | Iwayama et al. | | 358/475 |
| 8,941,900 B2* | 1/2015 | Ohk | | 358/518 |
| 2014/0044308 A1* | 2/2014 | Liang et al. | | 382/103 |
| 2014/0293383 A1* | 10/2014 | Ozawa | | 358/538 |

* cited by examiner

*Primary Examiner* — Dung Tran
(74) *Attorney, Agent, or Firm* — Staas & Halsey LP

(57) ABSTRACT

An apparatus for and a method of processing a document image are provided. The apparatus comprises: an estimation unit for estimating a brightness image from the document image; and a correction unit for correcting the brightness image by using brightness values of at least a part of edge pixels which lie on or in the adjacency of edges of the brightness image in parallel with x direction, wherein directions of neighboring two edges of the brightness image are set to be x, y directions respectively, and wherein compared with x direction, brightness values of pixels of the brightness image change relatively slightly or do not change along y direction; wherein the correction unit performs interpolation on a straight line extending along y direction by using the brightness values of the edge pixels on the straight line, thereby correcting brightness values of other pixels on the straight line.

13 Claims, 9 Drawing Sheets

(a)

(b)

(c)

(a)　　　　　　　　(b)

APPARATUS FOR AND METHOD OF PROCESSING DOCUMENT IMAGE

CROSS REFERENCE TO RELATED APPLICATIONS

This application claims the benefit of Chinese Application No. 201310656652.6, filed Dec. 6, 2013, the disclosure of which is incorporated herein by reference.

TECHNICAL FIELD

The disclosure generally relates to a field of image processing, and particularly to an apparatus for processing a document image and a method of processing a document image to correct a brightness image.

BACKGROUND ART

For a document image obtained through scanning or photographing, e.g. a document image scanned by an overhead scanner, since the image is illuminated by for example a light source (such as LED) on the scanner, the scanned image obtained possibly has a shadow. Due to the existence of the shadow, the quality of the image is deteriorated. Therefore, it is necessary to remove the shadow such that a background of the image is uniform.

The currently-used method of removing a shadow is to adjust an image intensity of a document image according to a brightness image obtained by estimating from the document image, so as to remove the shadow, thereby obtaining a document image with a uniform background. Hereinafter, the fundamental principle of removing a shadow will be described in combination with equations (1) and (2). As shown in equation (1):

$$I_Y = L_Y R_Y \tag{1}$$

where $I_Y$ represents an input image, $L_Y$ represents a brightness image, and $R_Y$ represents a reflected image.

Therefore, an image with a uniform background can be obtained from equation (2):

$$\tilde{I}_Y = cR_Y = \frac{cI_Y}{L_Y + \varepsilon} \tag{2}$$

where c is a constant, which means an average image gray scale; and $\varepsilon$ is a very small constant, serving to prevent the denominator from being 0.

FIG. 1 is a view illustrating a document image obtained through scanning ((a) in FIG. 1), a brightness image estimated from document image ((b) in FIG. 1) and a document image with a uniform background after removal of a shadow ((c) in FIG. 1). It follows that obtaining an accurate brightness image is the key for removing a shadow from a document image. At present, more and more attention is being drawn to the problem as to how to obtain a more accurate brightness image.

SUMMARY OF THE INVENTION

An object of the disclosure is to provide an apparatus for processing a document image and a method of processing a document image which are capable of obtaining a more accurate brightness image through proper correction.

According to one aspect of the disclosure, an apparatus for processing a document image is provided, comprising: an estimation unit for estimating a brightness image from the document image; and a correction unit for correcting the brightness image by using brightness values of at least a part of edge pixels which lie on or in the adjacency of edges of the brightness image in parallel with x direction, wherein directions of neighboring two edges of the brightness image are set to be x, y directions respectively, and wherein compared with x direction, brightness values of pixels of the brightness image change relatively slightly or do not change along y direction; wherein the correction unit performs interpolation on a straight line extending along y direction by using the brightness values of the edge pixels on the straight line, thereby correcting brightness values of other pixels on the straight line.

According to an embodiment of the disclosure, the apparatus for processing a document image may further comprise a modification unit, for determining a position where a jump occurs in the brightness values of the edge pixels, and modifying the brightness value at the position where the jump occurs.

According to an embodiment of the disclosure, the apparatus for processing a document image may further comprise a modification unit, for modifying brightness values of the edge pixels at a position where a large hole previously existed, when the estimation unit estimates the brightness image in a hole-filling manner.

According to an embodiment of the disclosure, the modification unit may be configured to: perform the modification according to brightness values of edge pixels on an opposite side but having x coordinates closer to those of pixels at positions to be modified; or perform the modification according to brightness values of pixels in normalized symmetry with the pixels at the positions to be modified across a designated x coordinate point; or perform the modification according to brightness values of the edge pixels on the opposite side but having x coordinates closer to those of the pixels in normalized symmetry across with the pixels at the positions to be modified the designated x coordinate point.

According to an embodiment of the disclosure, the modification unit may be configured to: perform the modification by using brightness values at positions, on brightness images of document images having adjacent numbers of pages, which have coordinates closer to that of the positions to be modified, if there are brightness images of other document images which are collected in batches.

According to an embodiment of the disclosure, the estimation unit may be configured to perform a predetermined number of cycles of contracted-type filling on all holes beforehand.

According to another aspect of the disclosure, an apparatus for processing a document image is provided, comprising: a modification unit for modifying brightness values of unreliable pixels in the brightness image; wherein the modification unit is configured to: perform the modification by using brightness values of the pixels at positions in normalized symmetry with the unreliable pixels across a designated x coordinate point; or perform the modification by using brightness values at other positions having x coordinates closer to those of the unreliable pixels; or perform the modification by using brightness values at other positions having x coordinates closer to those of the positions in normalized symmetry with the unreliable pixels across the designated x coordinate point.

According to an embodiment of the disclosure, the apparatus for processing a document image may further comprise a determination unit for determining the unreliable pixels. The determination unit may be configured to: determine, as a position where the unreliable pixels lie, a position on the brightness image which corresponds to a filled big hole, if the estimation unit estimates the brightness image in a hole-filling manner.

According to an embodiment of the disclosure, the apparatus for processing a document image may further comprise a determination unit for determining the unreliable pixels. The determination unit may be configured to: when a jump occurs on a certain brightness curve or on an entire brightness curved surface presented by the brightness image, determine the position where the jump occurs as the position where the unreliable pixels lie.

According to another aspect of the disclosure, a method of processing a document image is provided, comprising: estimating a brightness image from the document image; and setting directions of neighboring two edges of the brightness image to be x, y directions respectively, wherein compared with x direction, brightness values of pixels of the brightness image along y direction change relatively slightly or do not change, the method further comprising: correcting the brightness image by using brightness values of at least a part of edge pixels which lie on or in the adjacency of edges of the brightness image in parallel with x direction; wherein, an interpolation is performed on a straight line extending along y direction by using the brightness values of the edge pixels on the straight line, thereby correcting brightness values of other pixels on the straight line.

According to another aspect of the disclosure, a method of processing a document image is provided, comprising: performing a modification on brightness values of unreliable pixels in the brightness image. Wherein, the modification is may be performed by using brightness values of the pixels at positions in normalized symmetry with the unreliable pixels across a designated x coordinate point; or the modification is performed by using brightness values at other positions having x coordinates closer to those of the unreliable pixels; or the modification is performed by using brightness values at other positions having x coordinates closer to those of the positions in normalized symmetry with the unreliable pixels across the designated x coordinate point.

By using the apparatus for and method of processing a document image according to the present disclosure, a more accurate brightness image can be obtained thought an appropriate correction, such that the shadow on the document image can be more actually removed. Thus, a document image with uniform background can be obtained.

BRIEF DESCRIPTION OF THE DRAWINGS

The above and other objects, features and advantages of the disclosure would be understood more easily with reference to the descriptions of the embodiments of the disclosure combined with the appended drawings below. In the appended drawings, identical or corresponding technical features or components will be denoted by using identical or corresponding reference signs. In the appended drawings, sizes and relative positions of units are not necessarily drawn in proportion.

DETAILED DESCRIPTION OF THE EMBODIMENTS

Embodiments of the disclosure will be described with reference to the appended drawings below. It should be noted that, for the sake of clarity, representations and descriptions of components and processing known to a person skilled in the art which are irrelevant to the disclosure are omitted in the appended drawings and descriptions thereof.

Figure 1:
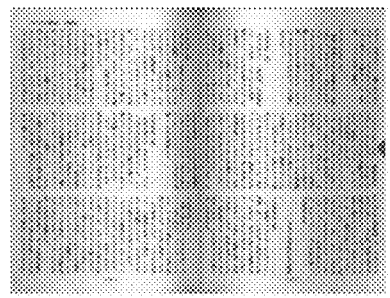
FIG. 1 is a view illustrating a document image obtained through scanning, a brightness image estimated from the document image and a document image with a uniform background after removal of a shadow.
Figure 1:
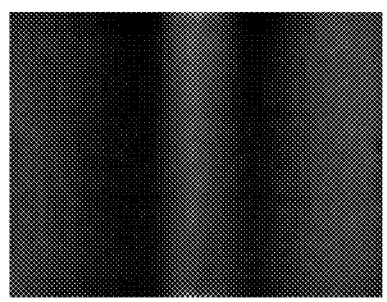
Figure 1:
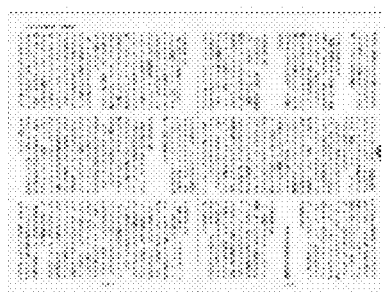
Figure 2:
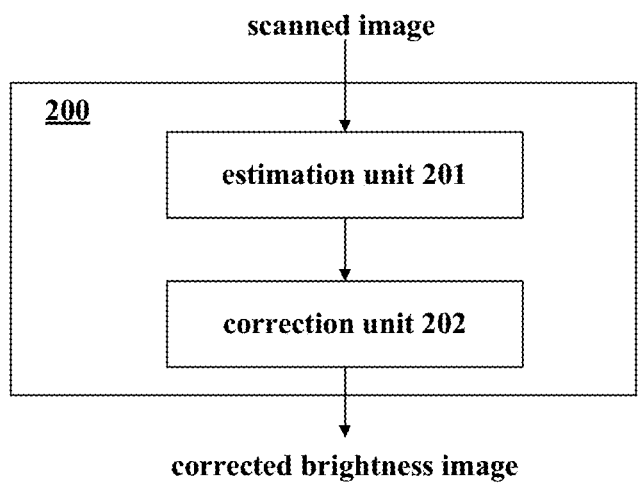
FIG. 2 is a structural block diagram illustrating an apparatus for processing a document image according to an embodiment of the disclosure.

FIG. 2 is a structural block diagram illustrating an apparatus 200 for processing a document image according to an embodiment of the disclosure. The apparatus 200 for processing a document image comprises: an estimation unit 201 for estimating a brightness image from the document image; and a correction unit 202 for correcting the estimated brightness image.

As shown in FIG. 2, after a document image obtained through for example scanning or photographing is inputted to the apparatus 200 for processing a document image, the estimation unit 201 estimates a brightness image of the document image according to the document image, and inputs the obtained brightness image to the correction unit 202 for correction. After performing correction processing, the correction unit 202 outputs the corrected brightness image, for providing to a subsequent processing unit to perform processing.

There are various methods of estimating a brightness image of the document image according to the document image, which can be selected for use by a person skilled in the art as requirements, so as to configure the estimation unit 201. Herein, descriptions are made only by taking a method of hole-filling as an example.

Figure 3:
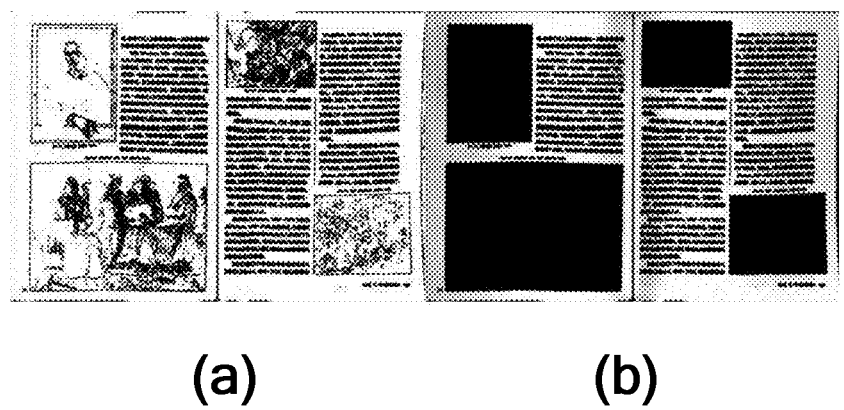
FIG. 3 is a schematic view for explaining the principle of a hole-filling method for obtaining a brightness image.

FIG. 3 is a schematic view for explaining the principle of a hole-filling method for obtaining a brightness image. In FIG. 3, (a) illustrates a gradient map of a document image obtained through scanning. Brightness information of a part of regions of the document image can be determined directly, while brightness information of the other portion such as text and illustrations shall be obtained through estimation due to existence of ink. Thus, in an intermediate step of acquiring a brightness image, all the portions such as text and illustrations become holes (black hollow holes), as shown by (b) in FIG. 3. Obviously, the text portion is a hole having a smaller size (a small hole), while the illustration portion is a hole having a larger size (a large hole). During hole-filling, the estimation unit 201 performs filling on the respective holes by using proper brightness values. The estimation unit 201 may adopt either the same filling method or different filling methods for the large hole and the small hole. For example, the estimation unit 201 may perform interpolation on pixels in the large hole for example in a line-by-line manner by using brightness values of pixels at edges of the large hole or an average value of the brightness values, so as to perform filling on the large hole. In addition, for example, the estimation unit 201 may perform filling on the small hole by using an average value of the brightness of pixels of surrounding regions of the small hole. The "large hole" may be determined according to a predetermined size standard. For example, a hole with a height greater than or equal to ¼ of a total height of the document image may be regarded as the large hole.

In one embodiment according to the disclosure, the estimation unit 201 may be configured to perform a predetermined number of cycles of contracted-type filling on all the holes in the document image first. The so-called contracted-type filling is to perform filling in a cycle-by-cycle manner from an edge of a hole to a center of the hole by taking brightness values of pixels of neighboring regions of the hole as a reference. The contracted-type filling performed at the earlier stage of the hole-filling can reduce the sizes of the respective holes, and even fill in a smaller hole fully. The number of cycles of performing the contracted-type filling may be determined as requirements. For example, in the example as shown by (b) in FIG. 3, the annotation text of the illustration constitutes a smallest hole. It is closely adjacent to a large hole constituted by the illustration, thus possibly producing an influence on the filling of the large hole. Therefore, a predetermined number of cycles, for example 5 cycles of contracted-type filling, may be performed first, so as to remove the smallest hole.

In addition, in performing scanning on a folio document, such as a book and so on, since a position of a middle seam of the document is recessed, the brightness at a corresponding middle line position in a document image obtained through the scanning is possibly darker. Therefore, in estimating the brightness image, it is regarded as a slim hole. The hole runs through the whole document, so a greater influence on brightness image estimation will be produced. In this case, the contracted-type filling performed in advance can remove the hole in the middle line by the method of field diffusion, such that a subsequent bright image estimation result is more accurate.

Turning back to FIG. 2, the correction unit 202 is configured to correct the brightness image by using brightness values of at least a part of edge pixels which lie on or in the adjacency of edges of the brightness image in parallel with x direction, wherein directions of neighboring two edges of the brightness image are set to be x, y directions respectively. As compared with x direction, brightness values of pixels of the brightness image change relatively slightly or do not change along y direction. Specifically, the correction unit 202 performs interpolation on a straight line extending along y direction by using the brightness values of the edge pixels on the straight line, thereby correcting brightness values of other pixels on the straight line.

The reason why the correction unit 202 is configured in such a way is that brightness images generated from the document image generally have some common features. Hereinafter, the features will be described sequentially.

Firstly, changes in the brightness values on the brightness image generally have different change rules along different directions. For example, the brightness values of the brightness image possibly change more slightly along a certain direction than along another direction, which may be caused by several reasons. For example, due to illumination of scanner light sources (e.g. LEDs) or camera light sources arranged in a matrix or line shape, a regular change in the brightness values occurs. Or for example, for a brightness image of a document image obtained from a folio document, brightness values change relatively slightly or do not change along a direction parallel to a gutter due to a curved shape of paper sheets when the book is open. In addition, a shadow will also be produced at the gutter per se of the folio.

In this case, in trying to determine a position of reference pixels of brightness values which shall be used when correcting brightness values at a specific position, as compared with a direction where a change in the brightness values is relatively great, the brightness values having been corrected will be more accurate if the position of the reference pixels is looked for in a direction where the brightness values change relatively slightly or do not change.

As can be seen from observations, for a document image obtained from a folio document, the brightness of the document image changes relatively slightly or does not change along its gutter direction, and the brightness of the document image changes relatively greatly along a direction perpendicular to the gutter. In a case where the document image is a rectangle and its gutter is parallel to one edge of the rectangle, the document image changes more slightly along a direction (y direction) of an edge (a side edge) parallel to the gutter than along a direction (x direction) of an edge (an upper or lower edge) perpendicular to the gutter.

For documents in other binding forms, for example a document which has not been bound and can be placed smoothly on a scanner, due to a change in a light source, it will also involve a case where the brightness along a direction of an edge parallel to a document image changes more slightly than along a direction parallel to another intersecting edge. No matter in which of the above cases, as long as it is satisfied that the document image is a rectangle, the correction unit 202 can set the direction of the edge where the brightness changes relatively slightly or does not change to be y direction, and set the direction of the edge where the brightness changes relatively greatly to x direction, and perform correction by using brightness values of reference pixels in y direction of pixels whose brightness values are to be corrected, i.e. brightness values of pixels having x coordinate which is the same as (or similar to) those of the pixels whose brightness values are to be corrected Secondly, in general cases, edge regions of a document, for example, upper and lower edge regions and edge regions at both sides of a book, are relatively simple and do not contain any content. In typical cases, estimated brightness values of portions in a brightness image of a document image which correspond to relatively simple regions of a document are credible. Therefore, other portions of the brightness image may be corrected by using at least a part of brightness values at edges of the brightness image or in adjacent regions thereof.

For example, the correction is performed by using brightness values of pixels on edges of the brightness image. Or alternatively, the brightness image is corrected by using an average value of brightness values of some pixels which lie on or in the adjacency of edges, i.e. on edge regions.

In one example, for a folio book which is bound longitudinally, a direction to which upper and lower edges correspond is x direction, and a direction to which left and right edges correspond is y direction. The brightness in y direction changes slightly, so the brightness of other pixels on straight line y=x1 may be corrected by using brightness values of edge pixels which lie on or in the adjacency of edges in parallel with x direction, for example brightness values of edge pixels at x=x1 or an average value of brightness values of several edge pixels at x=x1. For example, the correction unit 202 may perform interpolation on the straight line y=x1 by using brightness values (or an average value) of edge pixels at x=x1, thereby correcting brightness values of other pixels on the straight line y=x1.

Figure 4:
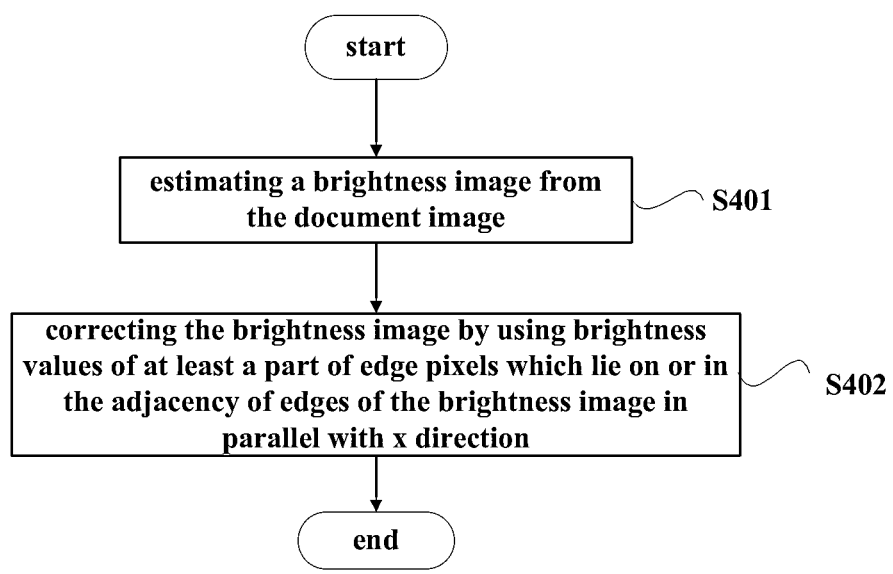
FIG. 4 is a flowchart illustrating a method of processing a document image carried out by an apparatus for processing a document image according to an embodiment of the disclosure.

FIG. 4 is a flowchart illustrating a method of processing a document image carried out by the apparatus 200 for processing a document image according to an embodiment of the disclosure.

In step S401, a brightness image of an input document image is estimated according to the input document image. Methods of estimating the brightness image include any brightness image estimation method well-known in the art such as the hole-filling method described above and so on.

In step S402, directions of neighboring two edges of the brightness image are set to be x, y directions respectively, wherein compared with x direction, brightness values of pixels of the brightness image along y direction change relatively slightly or do not change, and the brightness image is corrected by using brightness values of at least a part of edge pixels which lie on or in the adjacency of edges of the brightness image in parallel with x direction. Specifically, in step S402, interpolation is performed on a straight line extending along y direction by using the brightness values (including an average value of the brightness values) of the edge pixels on the straight line, thereby correcting brightness values of other pixels on the straight line.

In most cases, all portions in the brightness image which correspond to the edge region of the document are relatively accurate, but some special cases cannot be excluded. For example, a relatively large picture is edited in an edge region of a certain magazine, etc. In this case, the brightness of edge pixels in a brightness picture is possibly inaccurate. Therefore, it is necessary to properly modify brightness values of the pixels in the edge region before correcting the brightness image by using the brightness values of the pixels in the edge region.

Figure 5:
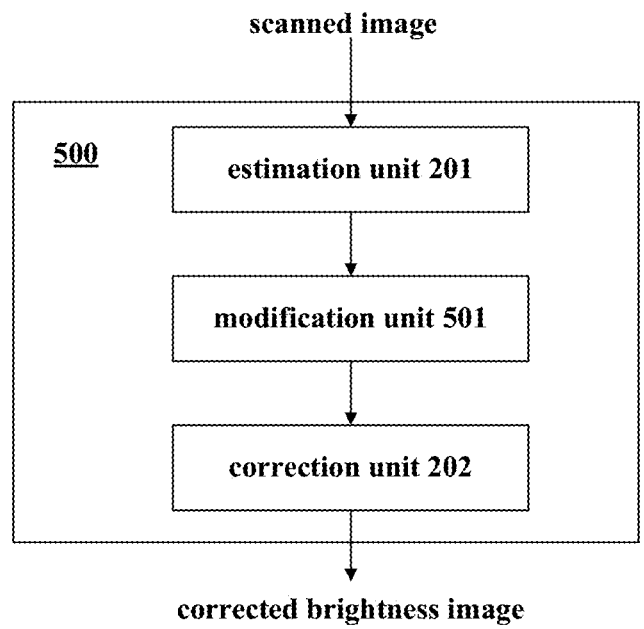
FIG. 5 is a structural block diagram illustrating an apparatus for processing a document image according to another embodiment of the disclosure.

FIG. 5 is a structural block diagram illustrating an apparatus 500 for processing a document image according to another embodiment of the disclosure. The estimation unit 201 and the correction unit 202 in the apparatus 500 for processing a document image have the same structure and perform the same function as the estimation unit 201 and the correction unit 202 in the apparatus 200 for processing a document image, and detailed descriptions thereof are omitted herein. The apparatus 500 for processing a document image further comprises a modification unit 501. The modification unit 501 is used for correcting brightness values of edge pixels which are possibly inaccurate (unreliable).

In one embodiment according to the disclosure, the modification unit 501 is configured to determine a position where a jump occurs in the brightness values of the edge pixels, and to modify the brightness value at the position where the jump occurs. Herein, that a "jump" occurs in the brightness values indicates that the edge pixels involve a case where gradients of adjacent pixels are relatively great or involve a case where a difference value in brightness values of adjacent pixels is relatively great.

According to another embodiment, the modification unit 501 may determine brightness values of the edge pixels at a position where a large hole previously existed as being unreliable and modify these brightness values, when the estimation unit 201 performs estimation on the brightness image in a hole-filling manner. For example, when a relatively large picture is edited in an edge region of a certain magazine, in estimating a brightness image, the relatively great picture corresponds to a large hole. Brightness values obtained by performing filling on the large hole possibly lack accuracy. In this case, the modification unit 501 directly regards the brightness values of the edge pixels at the position as being unreliable, thereby performing modification.

The modification unit 501 may modify the unreliable brightness values of the edge pixels by adopting different methods as requirements. For example, when the modification unit 501 determines that a jump occurs in the brightness values of the edge pixels, smoothing may be performed on brightness values of jump pixels by using brightness values of pixels adjacent to the pixels in which the jump occurs.

According to one embodiment according to the disclosure, the modification unit 501 may modify the unreliable brightness values by using brightness values (or a brightness average value) of pixels at a position corresponding to the position of the pixels having the unreliable brightness values. Specifically, the modification unit 501 may be configured to: (1) perform the modification according to brightness values of edge pixels on an opposite side but having x coordinates closer to those of pixels at positions to be modified; (2) or perform the modification according to brightness values of pixels in normalized symmetry with the pixels at the positions to be modified across a designated x coordinate point; (3) or perform the modification according to brightness values of the edge pixels on the opposite side but having x coordinates closer to those of the pixels in normalized symmetry with the pixels at the positions to be modified across the designated x coordinate point.

Figure 6:
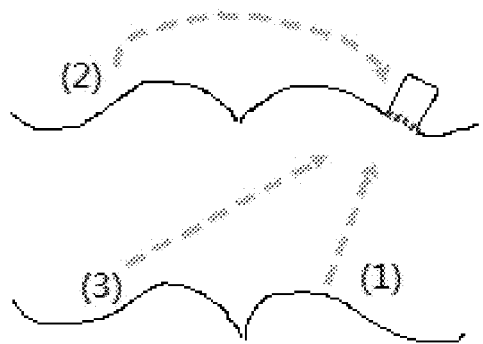
FIG. 6 is a schematic view illustrating a modification manner of edge pixel brightness values according to an embodiment of the disclosure.

FIG. 6 is a schematic view illustrating the above modification manners (1) to (3). As shown in FIG. 6, both upper and lower curved lines represent brightness curves of pixels of both upper and lower edges of the brightness image, wherein a position where brightness values are unreliable is represented by a protruding rectangle. The representation "(1)" in FIG. 6 shows the foregoing first modification manner, i.e., to perform the modification according to brightness values of edge pixels on an opposite side but having x coordinates closer to those of pixels at positions to be modified. The meaning of x coordinates "closer" is: either to perform the modification according to brightness values of edge pixels on an opposite side but having the same x coordinates as those of pixels at positions to be modified, or to perform the modification according to an average value of brightness values of edge pixels on an opposite side but having the same x coordinates as those of pixels at positions to be modified and brightness values of edge pixels adjacent thereto. This also applies below.

The representation "(2)" in FIG. 6 shows the foregoing second modification manner, i.e., to perform the modification according to brightness values of pixels in normalized symmetry with the pixels at the positions to be modified across a designated x coordinate point. In FIG. 6, the "designated x coordinate point" corresponds to x coordinate corresponding to the middle seam (spine) of the book. The image obtained by scanning a document possibly should also be subjected to curved surface distortion correction before being inputted to the apparatus for processing a document image, and the image having been subjected to the curved surface distortion correction possibly has unequal lengths at the two sides of the middle seam coordinate, so normalization processing shall be performed before finding a right symmetry point. A person skilled in the art would appreciate how to calculate a normalized symmetry point.

The representation "(3)" in FIG. 6 shows the foregoing third modification manner, i.e., to perform the modification according to brightness values of the edge pixels on the opposite side but having x coordinates closer to those of the pixels in normalized symmetry point with the pixels at the positions to be modified across the designated x coordinate, which is similar to the second manner and will not be described in detail herein.

The above three modification manners may be used either for a case of determining from a brightness value jump that edge pixels having unreliable brightness values exist, or for a case of determining from a position where a large hole previously existed that edge pixels having unreliable brightness values exist. Hereinafter, another modification manner which also applies to the above two cases will be introduced. In addition, which of the above three modification manners is specifically selected for use may be determined based on degrees of reliability of brightness values of pixels at a position for performing the modification which are determined according to the above three modification manners.

In the another modification manner, the correction unit 501 may be configured to: perform the modification by using brightness values at positions, on brightness images of document images having adjacent numbers of pages, which have coordinates closer to that of the positions to be modified, if there are brightness images of other document images which are collected in batches. It would be appreciated easily that in performing image scanning in batches, influences produced by a light source such as a scanner light source and so on upon the brightness of each document image are the same. In addition, in case that the numbers of pages are relatively close, influences produced by a book page curve and so on upon each document image are also close to each other. Therefore, modification may be performed on a certain document image by using brightness images of document images having adjacent numbers of pages in the same batch. Specifically, positions of pixels for the modification on documents having adjacent numbers of pages may be selected with reference to the manner introduced above.

Figure 7:
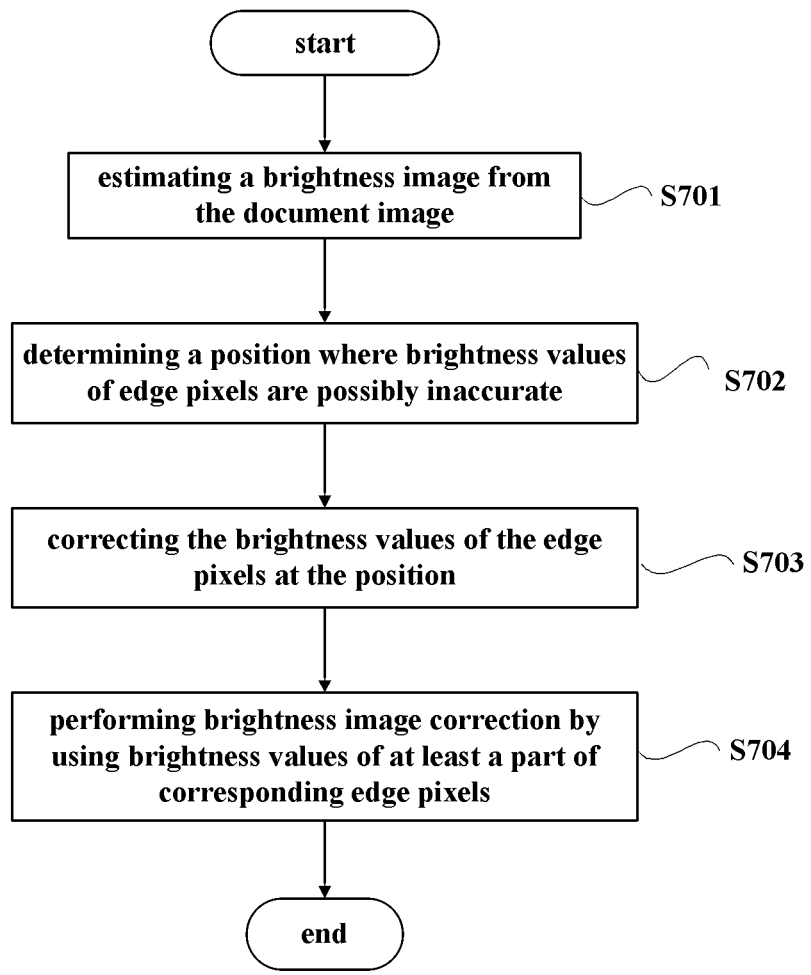
FIG. 7 is a flowchart illustrating a method of processing a document image carried out by an apparatus for processing a document image according to an embodiment of the disclosure.

FIG. 7 is a flowchart illustrating processing carried out by the apparatus 500 for processing a document image according to an embodiment of the disclosure, wherein steps S701 and S704 correspond to steps S401 and S402 in the flowchart as shown in FIG. 4 respectively, so detailed descriptions thereof are omitted.

In step S702, for the brightness image estimated in step S701, it is determined whether brightness values of edge pixels which lie on or in the adjacent regions of edges of the brightness image in parallel with x direction are reliable, and a position of edge pixels having unreliable brightness values is determined. Herein, directions of neighboring two edges of the brightness image are set to be x, y directions respectively, and compared with x direction, brightness values of pixels of the brightness image along y direction change relatively slightly or do not change. The position of edge pixels having unreliable brightness values for example is a position where a jump occurs to the brightness values of the edge pixels. Or alternatively, the position of edge pixels having unreliable brightness values for example is: in the case of performing brightness image estimation by a hole-filling method, a position on the edge where a large hole previously existed.

When it is determined in step S702 that edge pixels having unreliable brightness values exist, in step S703 the modification is performed on the brightness values of the edge pixels. For the specific manner of the modification, reference may be made to the manner described above.

Then, the brightness image after performing the modification on the brightness values of the edge pixels is inputted to the correction unit in the image processing apparatus 500, and correction on the brightness image is performed in step S704.

Figure 8:
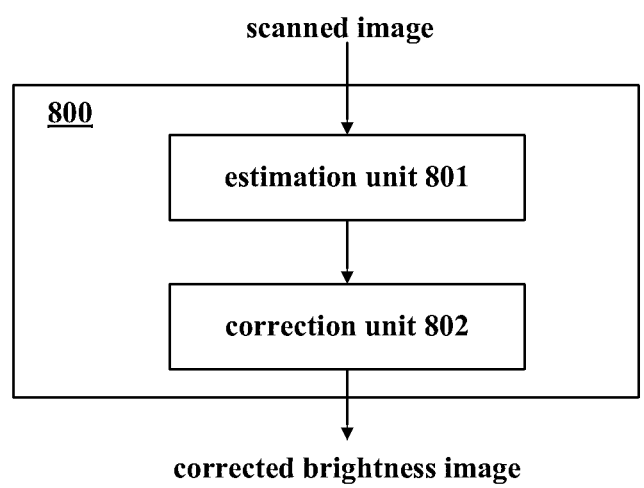
FIG. 8 is a structural block diagram illustrating another apparatus for processing a document image according to an embodiment of the disclosure.

FIG. 8 is a structural block diagram illustrating another apparatus 800 for processing a document image according to an embodiment of the disclosure. Similarly to the apparatus 200 for processing a document image as shown in FIG. 2, the apparatus 800 for processing a document image also comprises an estimation unit and a correction unit, wherein the estimation unit 801 performs the same function and has the same structure as the estimation unit 201, so detailed descriptions thereof are omitted herein.

The correction unit 802 and the correction unit 202 have different configurations. The correction unit 802 is configured to correct the brightness of the unreliable pixels in the brightness image. Herein, the so-called "unreliable pixels" are pixels whose brightness values possibly have relatively great estimation deviations. If directions of neighboring two edges of the brightness image are set to be x, y directions respectively, and compared with x direction, brightness values of pixels of the brightness image along y direction change relatively slightly or do not change, the correction unit 802 is configured to: perform the correction by using brightness values of the pixels at positions in normalized symmetry with the unreliable pixels across a designated x coordinate point; or perform the correction by using brightness values at other positions having x coordinates closer to those of the unreliable pixels; or perform the correction by using brightness values at other positions having x coordinates closer to those of the positions in normalized symmetry with the unreliable pixels across the designated x coordinate point. Taking a document image obtained from a folio book by performing scanning as an example, an example of the so-called "designated x coordinate" may be an x coordinate on the document image which corresponds to the middle seam of the book. Since lengths of the document image after performing curved surface distortion correction on the document image at the two sides of the designated x coordinate (for example a middle seam coordinate) are possibly not equal to each other, it is necessary to perform normalization on the lengths at the two sides before acquiring the symmetrical position.

For example, if the x coordinate at the middle seam of the document is set to be 0, while the position of the unreliable pixels is located at coordinate (x1, y1), after performing normalization processing of the lengths at the two sides of the middle seam, brightness values of pixels at position (−x1, y1) or a mean value of brightness values of the pixels at the position (−x1, y1) and pixels in adjacent regions thereof may be used to perform correction on the brightness values of the unreliable pixels. Or alternatively, brightness values of pixels on straight line x=x1 or in adjacent regions may also be used to perform correction on the brightness values of the unreliable pixels. Or alternatively, brightness values of pixels on straight line x=−x1 or in adjacent regions may also be used to perform correction on the brightness values of the unreliable pixels. Which region is specifically selected to perform correction may be determined according to a degree of reliability of pixels in candidate regions.

The unreliable pixels may be determined according to features of an input document image and the requirements of design.

Figure 9:
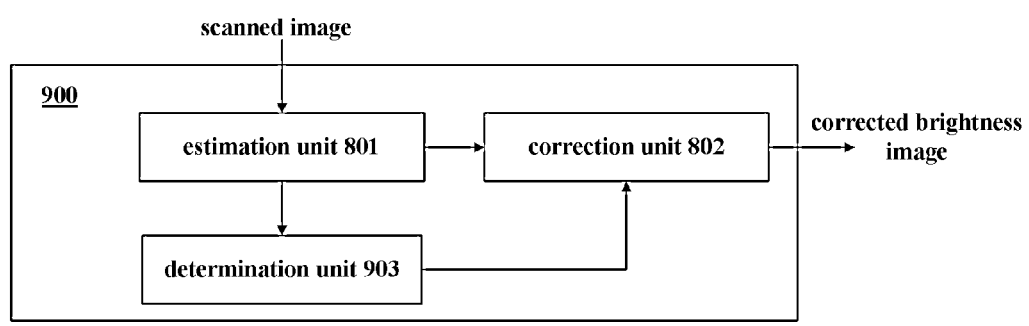
FIG. 9 is a structural block diagram illustrating an apparatus for processing a document image according to another embodiment of the disclosure.

FIG. 9 is a structural block diagram illustrating another apparatus 900 for processing a document image according to an embodiment of the disclosure. The apparatus 900 for processing a document image comprises an estimation unit 801, a correction unit 802 and a determination unit 903, wherein the estimation unit 801 and the correction unit 802 perform the same function and have the same structure as the estimation unit and the correction unit in the apparatus 800 for processing a document image, and detailed descriptions thereof are omitted herein.

The determination unit 903 is used for determining the unreliable pixels in the estimated brightness image, and notifying the correction unit 802 of a position of the determined unreliable pixels. In one embodiment, the determination unit 903 may be configured to: when a jump occurs on a certain brightness curve or on an entire brightness curved surface presented by the brightness image, determine the position where the jump occurs as the position where the unreliable pixels lie. In a case where the estimation unit estimates the brightness image in a hole-filling manner, the determination unit 903 may be configured to determine, as the position where the unreliable pixels lie, a position on the brightness image which corresponds to the filled big hole. The big hole for example is a hole with a height greater than or equal to ¼ of a height of the entire brightness image.

Figure 10:
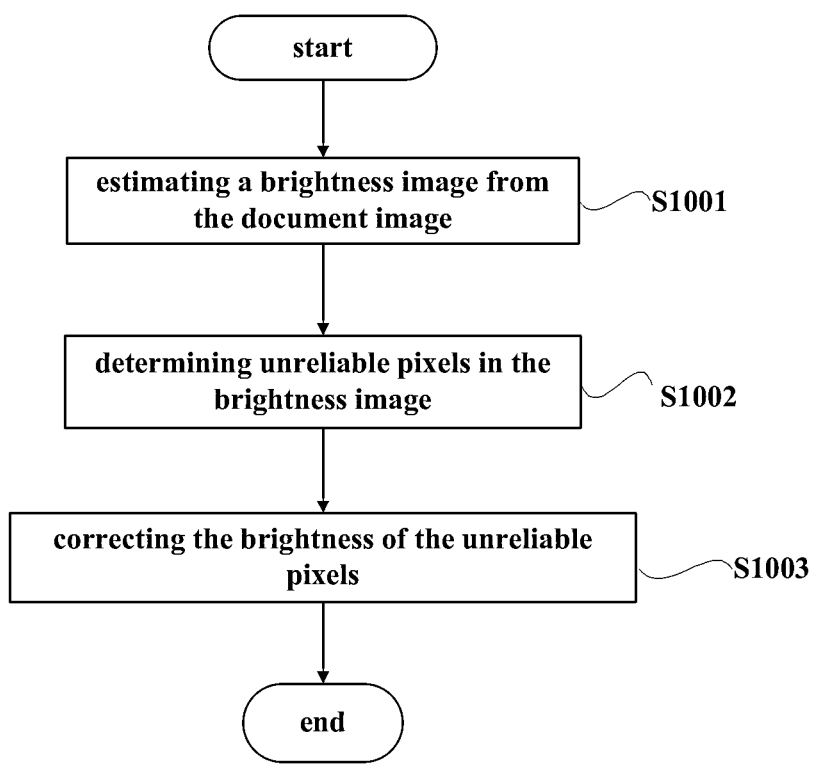
FIG. 10 is a flowchart illustrating a method of processing a document image carried out by an apparatus for processing a document image according to an embodiment of the disclosure.

FIG. 10 is a flowchart illustrating a method of processing a document image carried out by the apparatus 900 for processing a document image. In step S1001, estimation of a brightness image from an input document image is performed. The estimation method may adopt various methods well-known in the art and mentioned above.

In step S1002, unreliable pixels in the brightness image are determined. The method of determining the unreliable pixels may be determined according to features of the document image and the requirements of design, and may also adopt the method of determining unreliable pixels mentioned above.

In step S1003, brightness values of the unreliable pixels are corrected. For example, if directions of neighboring two edges of the brightness image are set to be x, y directions respectively, and compared with x direction, brightness values of pixels of the brightness image along y direction change relatively slightly or do not change, brightness values of the unreliable pixels in the brightness image may be performed by: performing the correction by using brightness values of the pixels at positions in normalized symmetry with the unreliable pixels across a designated x coordinate point; or performing the correction by using brightness values at other positions having x coordinates closer to those of the unreliable pixels; or performing the correction by using brightness values at other positions having x coordinates closer to those of the positions in normalized symmetry with the unreliable pixels across the designated x coordinate point.

The fundamental principle of the disclosure is described above in combination with detailed embodiments. However, it should be noted that: a person skilled in the art would appreciate that all the steps or components of or any step or component of the method and the apparatus according to the disclosure can be embodied in the form of hardware, firmware, software or combinations thereof in any computing device (including a processor, a storage medium, etc.) or network of computing devices, which would be carried out by a person skilled in the art by applying their basic programming skill based upon the descriptions of the disclosure.

Therefore, the object of the disclosure can also be achieved by running a program or a group of programs on any computing device. The computing device may be a well-known universal device. Therefore, the object of the disclosure may also be achieved only by providing a program product which includes a program code carrying out a method or a device. That is, such a program product also constitutes the disclosure, and a storage medium storing such a program product also constitutes the disclosure. Obviously, the storage medium may be any well-known storage medium or any storage medium that will be developed in the future.

Figure 11:
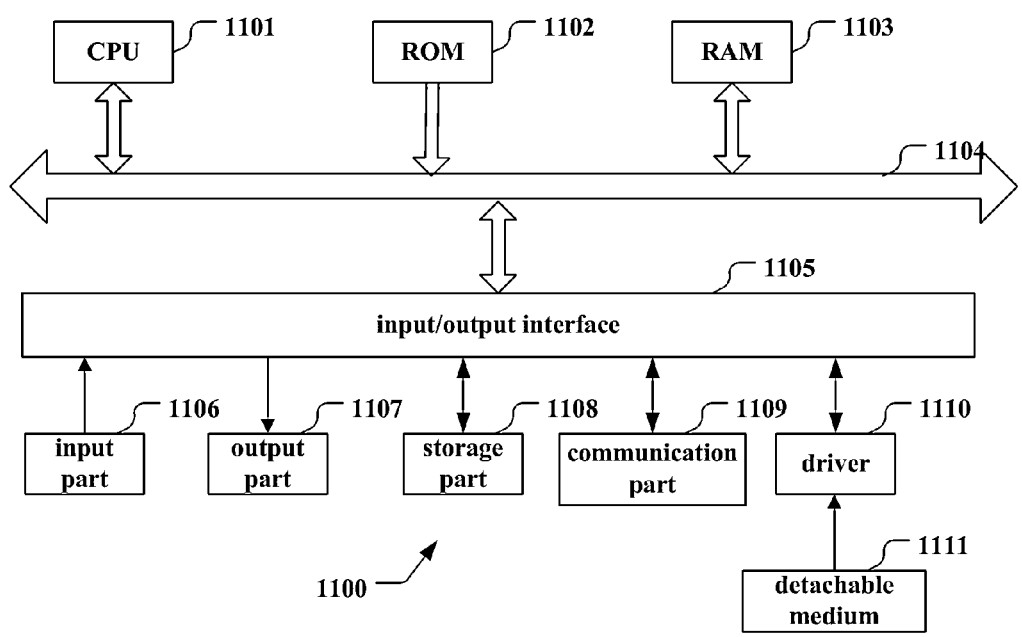
FIG. 11 is a block diagram illustrating an exemplary structure of a computer implementing the disclosure contents.

In the case of carrying out the embodiments of the present disclosure by software and/or firmware, a program constituting the software is installed into a computer having a dedicated hardware structure, e.g. the universal computer 1100 as shown in FIG. 11, from a storage medium or a network. When being installed with various programs, the computer can perform various functions and so on.

FIG. 11 is a block diagram illustrating an exemplary structure implementing a computer according to the disclosure. In FIG. 11, a Central Processing Unit (CPU) 1101 performs various processing according to a program stored in a Read-Only Memory (ROM) 1102 or a program uploaded from a storage part 1108 to a Random Access Memory (RAM) 1103. In the RAM 1103, data needed when the CPU 1101 performs various processing is also stored according to requirements.

The CPU 1101, the ROM 1102 and the RAM 1103 are connected to each other via a bus 1104. An input/output interface 1105 is also connected to the bus 1104.

The following components are connected to the input/output interface 1105: an input part 1106, including a keyboard, a mouse and so on; an output part 1107, including a display, such as a Cathode Ray Tube (CRT), a Liquid Crystal Display (LCD) and so on, as well as a loudspeaker and so on; the storage part 1108, including a hard disk and so on; and a communication part 1109, including network interface card such as an LAN card, a modem and so on. The communication part 1109 performs communication processing over a network such as Internet.

According to requirements, a driver 1110 is also connected to the input/output interface 1105. A detachable medium 1111 such as a magnetic disk, an optical disk, a magnetooptical disk, a semiconductor memory and so on is installed on the driver 1110 according to requirements, such that a computer program read therefrom is installed in the storage part 1108 according to requirements.

In the case of carrying out the above steps and processing by software, a program constituting the software is installed from a network such as Internet or a storage medium such as the detachable medium 1111.

A person skilled in the art would appreciate that such a storage medium is not limited to the detachable medium 1111 storing a program and distributed separately from the method to provide the program to a user as shown in FIG. 11. Examples of the detachable medium 1111 include a magnetic disk, an optical disk (including a DC Read-Only Memory (CD-ROM) and a Digital Versatile Disk (DVD)), a magenetooptical disk (including a Mini Disk (MD)) and a semiconductor memory. Or, the storage medium may be a hard disk included in the ROM 1102 and the storage part 1108, etc., in which a program is stored, and which is distributed together with the method including it to a user.

The disclosure further proposes a program product storing a machine-readable instruction code. When being read and executed by a machine, the instruction code may carry out the above method according to the embodiment of the disclosure.

Correspondingly, a storage medium for carrying out the program product storing a machine-readable instruction code is also included in the disclosure of the disclosure. The storage medium includes but is not limited to a floppy disk, an optical disk, a magnetooptical disk, a memory card, a memory stick, etc.

In addition, some methods and apparatuses for combination tools according to the embodiments of the disclosure can broaden a use range of a combination.

A person ordinarily skilled in the art would appreciate that the examples listed herein are exemplary, and the disclosure is not limited thereto.

As an example, the respective steps of the above method embodiment and the respective constituent modules and/or units of the above apparatus embodiment may be embodied as software, firmware, hardware or combinations thereof, and serve as a part of a corresponding apparatus. The specific means or manner that can be used when configuring the respective constituent modules and units in the above apparatus by software, firmware, hardware or a combination thereof are well-known to a person skilled in the art, and will not be redundantly described herein, As an example, in the case of implementation by software or firmware, a program constituting the software may be installed into a computer having a dedicated hardware structure (for example the universal computer 1100 as shown in FIG. 11) from a storage medium or a network. When being installed with various programs, the computer can perform various functions and so on.

In the above descriptions of the detailed embodiments of the disclosure, features described and/or shown for one embodiment may be used according to the same or similar way in one or more other embodiments, be combined with features in other embodiments, or substitute features in other embodiments.

It should be emphasized that the term "comprise/include" when used in the text refers to existence of a feature, an element, a step or an assembly, but does not exclude existence or addition of one or more other features, elements, steps or assemblies.

In addition, the method according to the disclosure is not limited to be carried out in the temporal order described in the Description, but may also be carried out sequentially, in parallel or independently in other temporal orders. Therefore, the order of carrying out the method described in the disclosure fails to constitute a limitation to the technical scope of the disclosure.

Although the disclosure is already disclosed above by the descriptions of the embodiments of the disclosure, it should be understood that a person skilled in the art can design various modifications, improvements or equivalents on the disclosure within the spirit and the scope of the appended claims. The modifications, improvements or equivalents shall also be regarded as being within the scope of protection of the disclosure.

ANNEX

The following exemplary embodiments (each referred to as an "EE") are described.

An apparatus for processing a document image, comprising:
an estimation unit for estimating a brightness image from the document image; and a correction unit for correcting the brightness image by using brightness values of at least a part of edge pixels which lie on or in the adjacency of edges of the brightness image in parallel with x direction, wherein directions of neighboring two edges of the brightness image are set to be x, y directions respectively, and wherein compared with x direction, brightness values of pixels of the brightness image change relatively slightly or do not change along y direction;
wherein the correction unit performs interpolation on a straight line extending along y direction by using the brightness values of the edge pixels on the straight line, thereby correcting brightness values of other pixels on the straight line.

2. The apparatus for processing a document image according to EE 1, further comprising a modification unit, for determining a position where a jump occurs in the brightness values of the edge pixels, and modifying the brightness value at the position where the jump occurs.

3. The apparatus for processing a document image according to EE 1, further comprising a modification unit, which is configured to modify brightness values of the edge pixels at a position where a large hole previously existed, when the estimation unit estimates the brightness image in a hole-filling manner.

4. The apparatus for processing a document image according to EE 2 or 3, wherein, the modification unit is configured to:
perform the modification according to brightness values of edge pixels on an opposite side but having x coordinates closer to those of pixels at positions to be modified; or perform the modification according to brightness values of pixels in normalized symmetry with the pixels at the positions to be modified across a designated x coordinate point; or
perform the modification according to brightness values of the edge pixels on the opposite side but having x coordinates closer to those of the pixels in normalized symmetry with the pixels at the positions to be modified across the designated x coordinate point.

5. The apparatus for processing a document image according to EE 2 or 3, wherein, the modification unit is configured to: perform the modification by using brightness values at positions, on brightness images of document images having adjacent numbers of pages, which have coordinates closer to that of the positions to be modified, if there are brightness images of other document images which are collected in batches.

6. The apparatus for processing a document image according to any one of EEs 1 to 3, wherein, the estimation unit is configured to perform a predetermined number of cycles of contracted-type filling on all holes first.

7. An apparatus for processing a document image, comprising:
an estimation unit for estimating a brightness image from the document image; and a correction unit for correcting brightness values of unreliable pixels in the brightness image;
wherein, if directions of neighboring two edges of the brightness image are set to be x, y directions respectively, and compared with x direction, brightness values of pixels of the brightness image along y direction change relatively slightly or do not change, the correction unit is configured to:
perform the correction by using brightness values of the pixels at positions in normalized symmetry with the unreliable pixels across a designated x coordinate point; or
perform the correction by using brightness values at other positions having x coordinates closer to those of the unreliable pixels; or
perform the correction by using brightness values at other positions having x coordinates closer to those of the positions in normalized symmetry with the unreliable pixels across the designated x coordinate point.

8. The apparatus for processing a document image according to EE 7, further comprising a determination unit for determining the unreliable pixels;
wherein, the determination unit is configured to: determine, as a position where the unreliable pixels lie, a position on the brightness image which corresponds to a filled big hole, if the estimation unit estimates the brightness image in a hole-filling manner.

9. The apparatus for processing a document image according to EE 7, further comprising a determination unit for determining the unreliable pixels;
the determination unit being configured to: when a jump occurs on a certain brightness curve or on an entire brightness curved surface presented by the brightness image, determine the position where the jump occurs as the position where the unreliable pixels lie.

10. A method of processing a document image, comprising:
estimating a brightness image from the document image; and setting directions of neighboring two edges of the brightness image to be x, y directions respectively, wherein compared with x direction, brightness values of pixels of the brightness image along y direction change relatively slightly or do not change, the method further comprising:
correcting the brightness image by using brightness values of at least a part of edge pixels which lie on or in the adjacency of edges of the brightness image in parallel with x direction; wherein, an interpolation is performed on a straight line extending along y direction by using the brightness values of the edge pixels on the straight line, thereby correcting brightness values of other pixels on the straight line.

11. The method of processing a document image according to EE 10, further comprising: before performing the correction, determining a position where a jump occurs in the brightness values of the edge pixels, and modifying the brightness value at the position where the jump occurs.

12. The method of processing a document image according to EE 10, further comprising: brightness values of the edge pixels at a position where a large hole previously existed are corrected before performing the correction, when a method of hole-filling is used when estimating the brightness image.

13. The method of processing a document image according to EE 11 or 12, wherein,
the modification is performed according to brightness values of edge pixels on an opposite side but having x coordinates closer to those of pixels at positions to be modified; or
the modification is performed according to brightness values of pixels in normalized symmetry with the pixels at the positions to be modified across a designated x coordinate point; or
the modification is performed according to brightness values of the edge pixels on the opposite side but having x coordinates closer to those of the pixels in normalized symmetry with the pixels at the positions to be modified across the designated x coordinate point.

14. The method of processing a document image according to EE 11 or 12, wherein, the modification is performed by using brightness values at positions, on brightness images of document images having adjacent numbers of pages, which have coordinates closer to that of the positions to be modified, if there are brightness images of other document images which are collected in batches.

15. The method of processing a document image according to any one of EEs 10 to 12, wherein, estimating the brightness image from the document image comprises: performing a predetermined number of cycles of contracted-type filling on all holes first.

16. A method of processing a document image, comprising:
estimating a brightness image from the document image; and setting directions of neighboring two edges of the brightness image to be x, y directions respectively, wherein compared with x direction, brightness values of pixels of the brightness image along y direction change relatively slightly or do not change, the method further comprising:
performing a correction on brightness values of unreliable pixels in the brightness image, wherein,
the correction is performed by using brightness values of the pixels at positions in normalized symmetry with the unreliable pixels across a designated x coordinate point; or
the correction is performed by using brightness values at other positions having x coordinates closer to those of the unreliable pixels; or
the correction is performed by using brightness values at other positions having x coordinates closer to those of the positions in normalized symmetry with the unreliable pixels across the designated x coordinate point.

17. The method of processing a document image according to EE 16, wherein, a position on the brightness image which corresponds to a filled big hole is determined as a position where the unreliable pixels lie, if a method of hole-filling is used when estimating the brightness image.

18. The method of processing a document image according to EE 16, wherein, when a jump occurs on a certain brightness curve or on an entire brightness curved surface presented by the brightness image, the position where the jump occurs is determined as the position where the unreliable pixels lie.

What is claimed is:

1. An apparatus for processing a document image, comprising:
   an estimation unit to estimate a brightness image from the document image; and
   a correction unit to correct the brightness image by using brightness values of at least a part of edge pixels which lie one of on and in an adjacency of edges of the brightness image in parallel with an x direction, wherein directions of two neighboring edges of the brightness image are set to be x, y directions respectively, and wherein as compared with the x direction, brightness values of pixels of the brightness image change one of relatively slightly and do not change along the y direction;
   wherein the correction unit performs interpolation on a straight line extending along the y direction by using the brightness values of the edge pixels on the straight line to correct brightness values of other pixels on the straight line.

2. The apparatus for processing a document image according to claim 1, further comprising a modification unit to determine a position where a jump occurs in the brightness values of the edge pixels, and to modify a brightness value at the position where the jump occurs.

3. The apparatus for processing a document image according to claim 2, wherein, the modification unit is configured to one of:
   perform the modification according to brightness values of edge pixels on an opposite side and having x coordinates closer to the x coordinates of pixels at positions to be modified;
   perform the modification according to brightness values of pixels in normalized symmetry with pixels at positions to be modified across a designated x coordinate point; and
   perform the modification according to brightness values of the edge pixels on the opposite side and having x coordinates closer to the x coordinates of the pixels in normalized symmetry with the pixels at the positions to be modified across the designated x coordinate point.

4. The apparatus for processing a document image according to claim 2, wherein, the modification unit is configured to perform the modification by using brightness values at positions, on brightness images of document images having adjacent numbers of pages, which have coordinates closer to the coordinates of the positions to be modified, if there are brightness images of other document images which are collected in batches.

5. The apparatus for processing a document image according to claim 1, further comprising a modification unit to modify brightness values of the edge pixels at a position where a large hole previously existed, when the estimation unit estimates the brightness image in a hole-filling manner.

6. The apparatus for processing a document image according to claim 5, wherein, the modification unit is configured to one of:
perform the modification according to brightness values of edge pixels on an opposite side and having x coordinates closer to the x coordinates of pixels at positions to be modified;
perform the modification according to brightness values of pixels in a normalized symmetry with pixels at positions to be modified across a designated x coordinate point; and
perform the modification according to brightness values of the edge pixels on an opposite side and having x coordinates closer to the x coordinates of the pixels in the normalized symmetry with the pixels at the positions to be modified across the designated x coordinate point.

7. The apparatus for processing a document image according to claim 5, wherein, the modification unit is configured to perform the modification by using brightness values at positions, on brightness images of document images having adjacent numbers of pages, which have coordinates closer to the coordinates of the positions to be modified, if there are brightness images of other document images which are collected in batches.

8. The apparatus for processing a document image according to claim 1, further comprising:
a modification unit to modify brightness values of unreliable pixels in the brightness image;
wherein, the modification unit is configured to one of:
perform the modification by using brightness values of the pixels at positions in a normalized symmetry with the unreliable pixels across a designated x coordinate point;
perform the modification by using brightness values at other positions having x coordinates closer to the x coordinates of the unreliable pixels; and
perform the modification by using brightness values at other positions having x coordinates closer to those of the positions in the normalized symmetry with the unreliable pixels across the designated x coordinate point.

9. The apparatus for processing a document image according to claim 8, further comprising a determination unit to determine the unreliable pixels;
wherein, the determination unit is configured to determine, as a position where the unreliable pixels lie, a position on the brightness image which corresponds to a filled large hole, if the estimation unit estimates the brightness image in a hole-filling manner.

10. The apparatus for processing a document image according to claim 8, further comprising a determination unit to determine the unreliable pixels;
the determination unit being configured to, when a jump occurs, one of on a brightness curve and on an entire brightness curved surface presented by the brightness image, determine a position where the jump occurs as the position where the unreliable pixels lie.

11. A method of processing a document image, comprising:
estimating a brightness image from the document image; and
setting directions of two neighboring edges of the brightness image to be x, y directions respectively, wherein as compared with the x direction, brightness values of pixels of the brightness image along the y direction change one of relatively slightly and do not change, the method further comprising:
correcting the brightness image by using brightness values of at least a part of edge pixels which lie one of on and in an adjacency of edges of the brightness image in parallel with the x direction;
wherein, an interpolation is performed on a straight line extending along the y direction by using the brightness values of the edge pixels on the straight line to correct brightness values of other pixels on the straight line.

12. The method of processing a document image according to claim 11, further comprising:
performing a modification on brightness values of unreliable pixels in the brightness image, wherein, one of:
the modification is performed by using brightness values of the pixels at positions in a normalized symmetry with the unreliable pixels across a designated x coordinate point;
the modification is performed by using brightness values at other positions having x coordinates closer to the x coordinates of the unreliable pixels; and
the modification is performed by using brightness values at other positions having x coordinates closer to the x coordinates of the positions in normalized symmetry with the unreliable pixels across the designated x coordinate point.

13. A non-transitory computer readable medium performing the method of claim 12.

* * * * *